(12) United States Patent
Gardiner et al.

(10) Patent No.: US 7,221,847 B2
(45) Date of Patent: May 22, 2007

(54) OPTICAL ELEMENTS HAVING PROGRAMMED OPTICAL STRUCTURES

(75) Inventors: Mark E. Gardiner, Santa Rosa, CA (US); Sanford Cobb, Lakeland, MN (US); Kenneth A. Epstein, St. Paul, MN (US); Wade D. Kretman, Afton, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/910,428

(22) Filed: Aug. 3, 2004

(65) Prior Publication Data

US 2005/0001043 A1    Jan. 6, 2005

Related U.S. Application Data

(62) Division of application No. 09/415,471, filed on Oct. 8, 1999, now Pat. No. 6,845,212.

(51) Int. Cl.
*G02B 6/10* (2006.01)
*G02B 27/10* (2006.01)

(52) U.S. Cl. .................. 385/146; 385/33; 385/901; 359/619; 362/31

(58) Field of Classification Search ........ 385/146–147, 385/901, 31, 33, 36–37; 359/575, 619; 362/27, 362/31; 349/64–65
See application file for complete search history.

(56) References Cited

U.S. PATENT DOCUMENTS

| 586,214 A | 7/1897 | Basquin |
| 586,220 A | 7/1897 | Basquin |
| 586,247 A | 7/1897 | Soper |
| 586,248 A | 7/1897 | Soper |
| 586,249 A | 7/1897 | Soper |
| 586,251 A | 7/1897 | Soper |
| 586,252 A | 7/1897 | Soper |
| 607,792 A | 7/1898 | Winger |
| 650,209 A | 5/1900 | White |
| 713,182 A | 11/1902 | Wadsworth |
| 719,066 A | 1/1903 | Wadsworth |
| 720,386 A | 2/1903 | Wadsworth |
| 720,987 A | 2/1903 | Wadsworth |
| 752,429 A | 2/1904 | Wadsworth |

(Continued)

FOREIGN PATENT DOCUMENTS

EP    0 167 721 A1    1/1986

(Continued)

OTHER PUBLICATIONS

IBM Technical Disclosure Bulletin, vol. 29, No. 11, *Backlighting for Liquid Crystal Display*, Apr. 1987.
IBM Technical Disclosure Bulletin, vol. 31, No. 2, *Flat Panel Backlight Reflecting Device*, Jul. 1988.

(Continued)

*Primary Examiner*—Sang H. Nguyen
(74) *Attorney, Agent, or Firm*—Stephen W. Buckingham

(57) ABSTRACT

An optical element, such as a lightguide or an optical film, is formed with a predetermined, programmed pattern of optical structures. The optical structures may be arranged to selectively correct for non-uniformities in the output a lightguide, or may be arranged to otherwise enhance the performance of a display.

13 Claims, 6 Drawing Sheets

U.S. PATENT DOCUMENTS

| | | |
|---|---|---|
| 755,196 A | 3/1904 | Wadsworth |
| 818,208 A | 4/1906 | Wadsworth |
| 2,099,034 A | 11/1937 | Rolph |
| 2,115,178 A | 4/1938 | Rolph |
| 2,143,148 A | 1/1939 | Guth |
| 2,179,863 A | 11/1939 | Rolph |
| 2,223,841 A | 12/1940 | Biller |
| 2,347,665 A | 5/1944 | Christensen et al. |
| 2,398,507 A | 4/1946 | Rolph |
| 2,714,816 A | 8/1955 | Pennell |
| 2,844,998 A | 7/1958 | Vincent |
| 3,721,818 A | 3/1973 | Stahlhut |
| 3,735,124 A | 5/1973 | Stahlhut |
| 3,891,302 A | 6/1975 | Dabby et al. |
| 3,994,564 A | 11/1976 | Somogyi |
| 4,053,208 A | 10/1977 | Kato et al. |
| 4,127,693 A | 11/1978 | Lemelson |
| 4,233,651 A | 11/1980 | Fabbri |
| 4,242,723 A | 12/1980 | Fabbri et al. |
| 4,298,249 A | 11/1981 | Gloor et al. |
| 4,337,759 A | 7/1982 | Popovich et al. |
| 4,416,515 A | 11/1983 | Funada et al. |
| 4,450,509 A | 5/1984 | Henry |
| 4,542,449 A | 9/1985 | Whitehead |
| 4,755,921 A | 7/1988 | Nelson |
| 4,804,253 A | 2/1989 | Stewart |
| 4,870,484 A | 9/1989 | Sonehara |
| 4,906,070 A | 3/1990 | Cobb, Jr. |
| 4,984,144 A | 1/1991 | Cobb, Jr. et al. |
| 5,005,108 A | 4/1991 | Pristash et al. |
| 5,022,728 A | 6/1991 | Fandrich |
| 5,040,883 A | 8/1991 | Cobb |
| 5,079,675 A | 1/1992 | Nakayama |
| 5,126,882 A | 6/1992 | Oe et al. |
| 5,128,783 A | 7/1992 | Abileah et al. |
| 5,151,801 A | 9/1992 | Hiroshima |
| 5,161,041 A | 11/1992 | Abileah et al. |
| 5,190,370 A | 3/1993 | Miller et al. |
| 5,206,746 A | 4/1993 | Ooi et al. |
| 5,262,928 A | 11/1993 | Kashima et al. |
| 5,280,371 A | 1/1994 | McCartney, Jr. et al. |
| 5,394,255 A | 2/1995 | Yokota et al. |
| 5,396,350 A | 3/1995 | Beeson et al. |
| 5,402,324 A | 3/1995 | Yokoyama et al. |
| 5,467,208 A | 11/1995 | Kokawa et al. |
| 5,467,417 A | 11/1995 | Nakamura et al. |
| 5,499,138 A | 3/1996 | Iba |
| 5,521,797 A | 5/1996 | Kashima et al. |
| 5,550,657 A | 8/1996 | Tanaka et al. |
| 5,552,907 A | 9/1996 | Yokota et al. |
| 5,587,816 A | 12/1996 | Gunjima et al. |
| 5,592,332 A | 1/1997 | Nishio et al. |
| 5,594,830 A | 1/1997 | Winston et al. |
| 5,598,280 A | 1/1997 | Nishio et al. |
| 5,600,455 A | 2/1997 | Ishikawa et al. |
| 5,600,462 A | 2/1997 | Suzuki et al. |
| 5,627,926 A | 5/1997 | Nakamura et al. |
| 5,695,269 A | 12/1997 | Lippmann et al. |
| 5,711,589 A | 1/1998 | Oe et al. |
| 5,735,590 A | 4/1998 | Kashima et al. |
| 5,771,328 A | 6/1998 | Wortman et al. |
| 5,775,791 A | 7/1998 | Yoshikawa |
| 5,779,337 A | 7/1998 | Saito et al. |
| 5,783,120 A | 7/1998 | Ouderkirk et al. |
| 5,808,709 A | 9/1998 | Davis et al. |
| 5,825,542 A | 10/1998 | Cobb, Jr. et al. |
| 5,825,543 A | 10/1998 | Ouderkirk et al. |
| 5,828,488 A | 10/1998 | Ouderkirk et al. |
| 5,831,697 A | 11/1998 | Evanicky et al. |
| 5,854,872 A | 12/1998 | Tai |
| 5,921,651 A | 7/1999 | Ishikawa |
| 5,997,148 A | 12/1999 | Ohkawa |
| 5,999,685 A | 12/1999 | Goto |
| 6,018,419 A * | 1/2000 | Cobb et al. ................ 359/500 |
| 6,027,222 A | 2/2000 | Oki et al. |
| 6,088,074 A | 7/2000 | Suzuki |
| 6,104,455 A | 8/2000 | Kashima |
| 6,322,236 B1 | 11/2001 | Campbell et al. |
| 6,354,709 B1 * | 3/2002 | Campbell et al. ........... 362/627 |
| 6,356,391 B1 * | 3/2002 | Gardiner et al. ............ 359/628 |

FOREIGN PATENT DOCUMENTS

| | | |
|---|---|---|
| EP | 426411 A | 5/1991 |
| EP | 0 534 140 A1 | 3/1993 |
| EP | 0 770 818 A2 | 5/1997 |
| EP | 0 787 942 A2 | 8/1997 |
| FR | 2 606 861 A1 | 5/1988 |
| GB | 806124 | 12/1958 |
| JP | 52-6496 | 1/1977 |
| JP | 54-127299 | 10/1979 |
| JP | 60-70601 | 4/1985 |
| JP | 60-73618 | 4/1985 |
| JP | 61-11782 | 1/1986 |
| JP | 63-10402 | 1/1986 |
| JP | 61-158367 | 7/1986 |
| JP | 2-28842 | 6/1990 |
| JP | 2-176629 | 7/1990 |
| JP | 2-214822 | 8/1990 |
| JP | 3-184020 | 8/1991 |
| JP | 3-184021 | 8/1991 |
| JP | 3-191329 | 8/1991 |
| JP | 6-18707 | 1/1994 |
| JP | 6-82635 | 3/1994 |
| JP | 6-242322 | 9/1994 |
| JP | 07159622 | 6/1995 |
| JP | 08304607 | 11/1996 |
| JP | 2559579 | 12/1996 |
| JP | 9-5528 | 1/1997 |
| JP | 09080429 | 3/1997 |
| JP | 09105804 | 4/1997 |
| JP | 09138301 | 5/1997 |
| JP | 09145932 | 6/1997 |
| JP | 09145933 | 6/1997 |
| JP | 09197134 | 7/1997 |
| JP | 09306221 | 11/1997 |
| JP | 10160939 | 6/1998 |
| JP | 10282316 | 10/1998 |
| JP | 10282343 | 10/1998 |
| JP | 10-340611 A | 11/1998 |
| JP | 10-339815 | 12/1998 |
| JP | 11202135 | 7/1999 |
| JP | 11250714 | 9/1999 |
| JP | 2000089009 | 3/2000 |
| WO | WO 89/02606 | 3/1989 |
| WO | WO 95/27919 | 10/1995 |

OTHER PUBLICATIONS

IBM Technical Disclosure Bulletin, vol. 33, No. 1B, *Polarized Backlight for Liquid Crystal Display*, Jun. 1990.

IBM Technical Disclosure Bulletin, vol. 33, No. 9, *High Efficiency Back Light for LCD*, Feb. 1991.

JP 096031217, Machine Transcription, ISTA's Paterra™, 20 pages.

JP 2000089009, Machine Transcription, ISTA's Paterra™, 20 pages.

IBM Technical Disclosure Bulletin, vol. 33, No. 1B, *Polazrized Backlight for Liquid Crystal Display*, Jun. 1990.

JP 096031217, Machine Transcription, ISTA's Paterra™, 20 pages, Feb. 2, 1996.

JP 2000089009, Machine Transcription, ISTA's Paterra™, 20 pages, Mar. 31, 2000.

\* cited by examiner

OPTICAL ELEMENTS HAVING PROGRAMMED OPTICAL STRUCTURES

CROSS REFERENCE TO RELATED APPLICATIONS

This application is a divisional of U.S. Ser. No. 09/415,471, filed Oct. 8, 1999, now U.S. Pat. No. 6,845,212, the disclosure of which is herein incorporated by reference.

BACKGROUND OF THE INVENTION

1. Field of the Invention

The invention relates generally to optical elements and more particularly to lightguides, optical films and other optical elements suitable for use in display devices and having programmed optical structures.

2. Description of the Related Technology

Backlit display devices, such as liquid crystal display (LCD) devices, commonly use a wedge-shaped lightguide. The wedge-shaped lightguide couples light from a substantially linear source, such as a cold cathode fluorescent lamp (CCFL), to a substantially planar output. The planar output is then used to illuminate the LCD.

One measure of the performance of the backlit display is its uniformity. A user can easily perceive relatively small differences in brightness of a display from one area of the display to the next. Even relatively small non-uniformities can be very annoying to a user of the display.

Surface diffusers or bulk diffusers, which scatter the light exiting the lightguide, are sometimes used to mask or soften non-uniformities. However, this diffusion also results in light being directed away from a preferred viewing axis. A net result can be a reduction in overall brightness of the display along the preferred viewing axis, which is another performance measure of a display device.

Unlike non-uniformities, from a subjective standpoint relatively small increases or decreases in overall brightness are not easily perceived by the user of the display device. However, the display device designer is discouraged by even the smallest decreases in overall brightness including decreases so small they might only be perceived by objective measurement. This is because display brightness and power requirements of the display are closely related. If overall brightness can be increased without increasing the required power, the designer can actually allocate less power to the display device, yet still achieve an acceptable level of brightness. For battery powered portable devices, this translates to longer running times.

SUMMARY OF THE INVENTION

In accordance with the invention, an optical element, such as a lightguide or an optical film, is formed with a predetermined, programmed pattern of optical structures. The optical structures may be arranged to selectively correct for non-uniformities in the output of a lightguide, or may be arranged to otherwise effect the performance of the display in a predetermined, and designed manner.

In a first aspect of the invention, an optically transmissive film having a first surface and a second surface and a first edge and a second edge is formed with a plurality of optical structures formed in the first side. The plurality of optical structures are arranged on the first side in a predetermined pattern, and each optical structure has at least one characteristic selected from the group consisting of an amplitude, a period and an aspect ratio. Each characteristic has a first value for a first predetermined location on the film between the first edge and the second edge and the characteristic has a second value, different from the first value, for a second predetermined location on the film, different than the first predetermined location on the film, between the first edge and the second edge.

In another aspect of the invention, the structure in accordance with the invention is part of a thick optical element, such as for example, a lightguide wedge. The structure is achieved on the thick element through injection molding, compression molding, or by bonding a film with the structure to the additional optical element.

BRIEF DESCRIPTION OF THE DRAWINGS

The many advantages and features of the present invention will become apparent to one of ordinary skill in the art from the following detailed description of several preferred embodiments of the invention with reference to the attached drawings wherein like reference numerals refer to like elements throughout and in which.

DETAILED DESCRIPTION OF THE PREFERRED EMBODIMENTS

The present invention is described in terms of several preferred embodiments, and particularly, in terms of an optical film or a lightguide suitable for use in a backlighting system typically used in flat panel display devices, such as a laptop computer display or a desktop flat panel display. The invention, however, is not so limited in application and one of ordinary skill in the art will appreciate that it has application to virtually any optical system, for example, to projection screen devices and flat panel televisions. Therefore, the embodiments described herein should not be taken as limiting of the broad scope of the invention.

Figure 1:
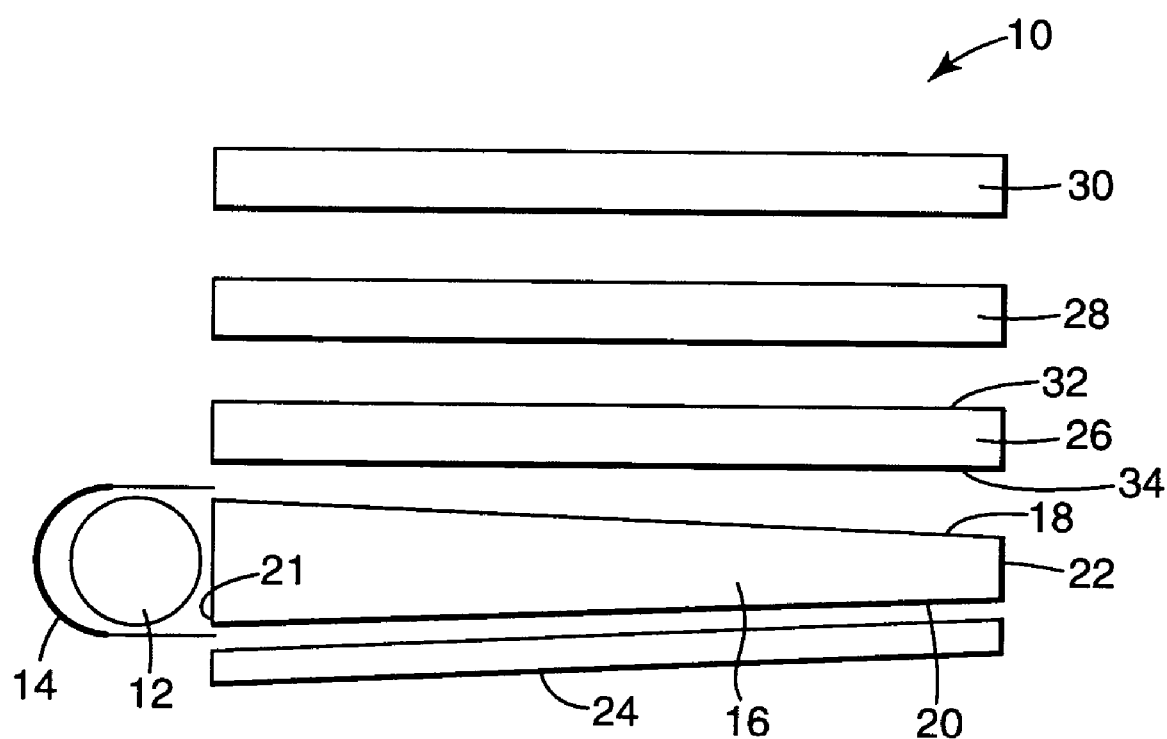
FIG. 1 is a perspective view of an illumination device adapted in accordance with an embodiment of the invention.

Referring to FIG. 1, an illumination system 10 includes a light source 12; a light source reflector 14; a lightguide 16 with an output surface 18, a back surface 20, an input surface 21 and an end surface 22; a reflector 24 adjacent the back surface 20; a first light redirecting element 26; a second light redirecting element 28; and a reflective polarizer 30. The lightguide 16 may be a wedge, a modification thereof or a slab. As is well known, the purpose of the lightguide is to provide for the distribution of light from the light source 12 over an area much larger than the light source 12, and more particularly, substantially over an entire area formed by output surface 18. The lightguide 16 further preferably accomplishes these tasks in a compact, thin package.

The light source 12 may be a CCFL that inputs light to the edge surface 21 of the lightguide 16, and the lamp reflector 14 may be a reflective film that wraps around the light source 12 forming a lamp cavity. The reflector 24 backs the lightguide 16 and may be an efficient back reflector, e.g., a lambertian film or a specular film or a combination.

In the embodiment shown, the edge-coupled light propagates from the input surface 21 toward the end surface 22, confined by total internal reflection (TIR). The light is extracted from the lightguide 16 by frustration of the TIR. A ray confined within the lightguide 16 increases its angle of incidence relative to the plane of the top and bottom walls, due to the wedge angle, with each TIR bounce. Thus, the light eventually refracts out of the output surface 18 and at a glancing angle thereto, because it is no longer contained by TIR. Some of the light rays are extracted out of the back surface 20. These light rays are reflected back into and through the lightguide 16 by the back reflector 24. First light redirecting element 26 is arranged as a turning film to redirect these light rays exiting the output surface 18 along a direction substantially parallel to a preferred viewing direction.

Figure 2:
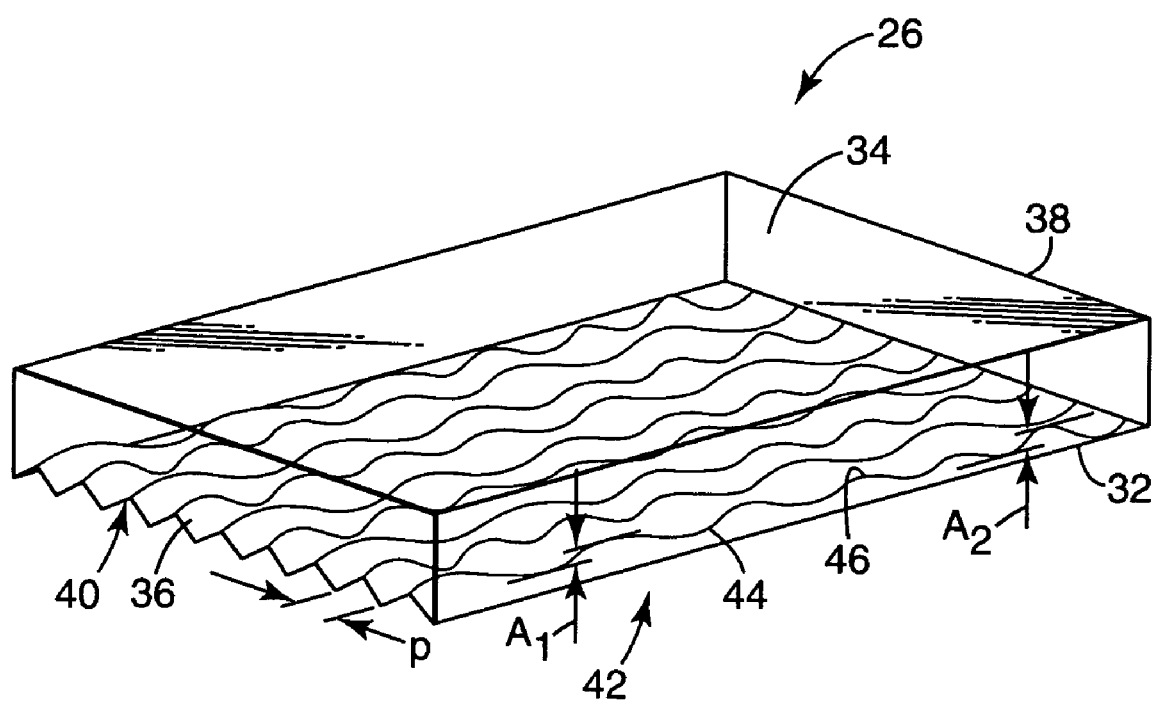
FIG. 2 is a perspective view of an optical film incorporating a programmed pattern of optical structures in accordance with one embodiment of the invention.

As shown in FIG. 2, the first light redirecting element 26 may be a light transmissive optical film with an output surface 32 and an input surface 34 formed with prisms (not shown), which refract and reflect the light exiting the lightguide 16 along the preferred viewing direction. The prisms may have a substantially uniform configuration, or may have a non-uniform configuration as described in commonly assigned U.S. patent application Ser. No. 90/415, 873 "OPTICAL FILM WITH VARIABLE ANGLE PRISMS" filed of even date herewith, the disclosure of which is hereby expressly incorporated herein by reference.

Referring back to FIG. 1, the second light redirecting element 28 may not be required in every configuration of the illumination system 10. When included in the system 10, the second light redirecting element may be a diffuser, a lenticular spreader or a prism film, for example a brightness enhancing film such as the 3M Brightness Enhancement Film product (sold as BEFIII) available from Minnesota Mining and Manufacturing Company, St. Paul, Minn. The reflective polarizer 30 may be an inorganic, polymeric or cholesteric liquid crystal polarizer film. A suitable film is the 3M Diffuse Reflective Polarizer Film product (sold as DRPF) or the Specular Reflective Polarizer film product (sold as DBEF), both of which are available from Minnesota Mining and Manufacturing Company. Furthermore, at least the second light redirecting element 28 and the reflective polarizer 30, and potentially the first light redirecting element 26, may be combined into a single optical element. The commonly assigned U.S. patent application Ser. No. 09/415, 471 entitled "DISPLAY ILLUMINATION DEVICE AND METHOD OF ENHANCING BRIGHTNESS IN A DISPLAY ILLUMINATION DEVICE" filed of even date herewith, the disclosure of which is hereby expressly incorporated herein by reference, describes several such combined optical structures.

With lightguides used for backlighting, such as lightguide 16, it is common for there to be non-uniformities in the light output from the lightguide. These non-uniformities can frequently be concentrated near the input surface 21. To mask these defects in applications of the lightguide, a diffuser that covers the output surface of the lightguide is typically used. However, a diffuser tends to reduce the overall brightness of the display and may not adequately mask all of the defects.

Referring now to FIG. 2, shown graphically is a film containing an in-phase varying amplitude pattern. The pattern described may be formed on a top or bottom surface of a wedge, on a plano film, or as described below, on a turning film. In that regard, in addition to the prisms formed on the input surface 34 of the first light redirecting element 26, the output surface 32 may be formed with optical structures. More particularly, the first light redirecting element 26 has a first edge 36 and a second edge 38. Extending from the first edge 36 toward the second edge 38 are a plurality of optical structures 40 arranged in a pattern 42. Each optical structure 40 may have a number of characteristics, such as amplitude, period and aspect ratio of the peaks 44 and valleys 46. The pattern 42 may also have characteristics, such as for example, a pitch, p, between optical structures 40. The structures 40 in FIG. 2 are shown having amplitude variation. In application of the first light redirecting structure 26, the grooves may be arranged such that variation in amplitude is perpendicular to the lightsource 12.

With continued reference to FIG. 2, it is observed that within the pattern 42, the optical structures 40 are formed with larger amplitude at the first edge 36 and decrease in amplitude toward the second edge 38. The larger amplitude produces more optical power along the groove axis because of the higher surface slopes. The optical power of this pattern then decreases as a function of the distance from the first edge 36. This arrangement of the optical structures 40 and the pattern 42 is purposeful. As noted, non-uniformities in the output of lightguide 16 may be concentrated near the input surface 21 while there may be less non-uniformity farther from the input surface 21. Thus, the optical structures 40 and the pattern 42 are arranged to provide more diffusion near first edge 36. In application, first edge 36 will be disposed substantially adjacent the input surface 21 of the lightguide 16. Pattern 42 may have a uniform pitch, p, as shown, and the depth of the optical structures 40 may decrease to naught toward the second edge 38. This pattern, as will be discussed in more detail below, may be produced with any tool type.

It should be appreciated that using ray tracing and other analysis techniques, it is possible to determine particular arrangements for the optical structures 40 and the pattern 42 that best correct particular observed non-uniformities in the output of the lightguide 16. That is, one or more of the characteristics of the optical structures 40 and the pattern 42 may be tailored to correct a particular non-uniformity. As described above, in connection with first light redirecting element 26, the optical structures 40 and the pattern 42 provided optical power to the output of the lightguide 16 near the input surface 21 in order to mask non-uniformities that may occur near the input surface 21. Less or no optical power is provided away from the input surface 21 as fewer or less intense non-uniformities are typically observed from the lightguide 16 farther from the input surface 21. In this manner, optical power is provided where most needed to mask or soften non-uniformities, while less optical power is provided where there may be fewer non-uniformities to mask. Moreover, optical power may be added virtually anywhere to the output of the lightguide by adding optical structures and/or varying the characteristics of the optical structures. Furthermore, the addition of optical power need not be uniform. Instead, optical power may be added, as necessary, to discrete regions of the lightguide output if necessary to help mask a defect or create a particular optical effect.

Planar light guides, and some wedge light guides that operate using frustrated TIR, may include an extractor pattern on a back surface of the lightguide. Typically, the extractor pattern is a pattern of white dots disposed on the back surface of the lightguide. Light incident to one of the dots is diffusely reflected by the white dot, and a portion of this reflected light is caused to exit the light guide. In spite of the diffuse nature of this method of extracting light from the lightguide, the pattern of dots may itself be visible in the lightguide output. Thus, to hide the dot pattern, additional diffusion is typically provided.

Figure 3:
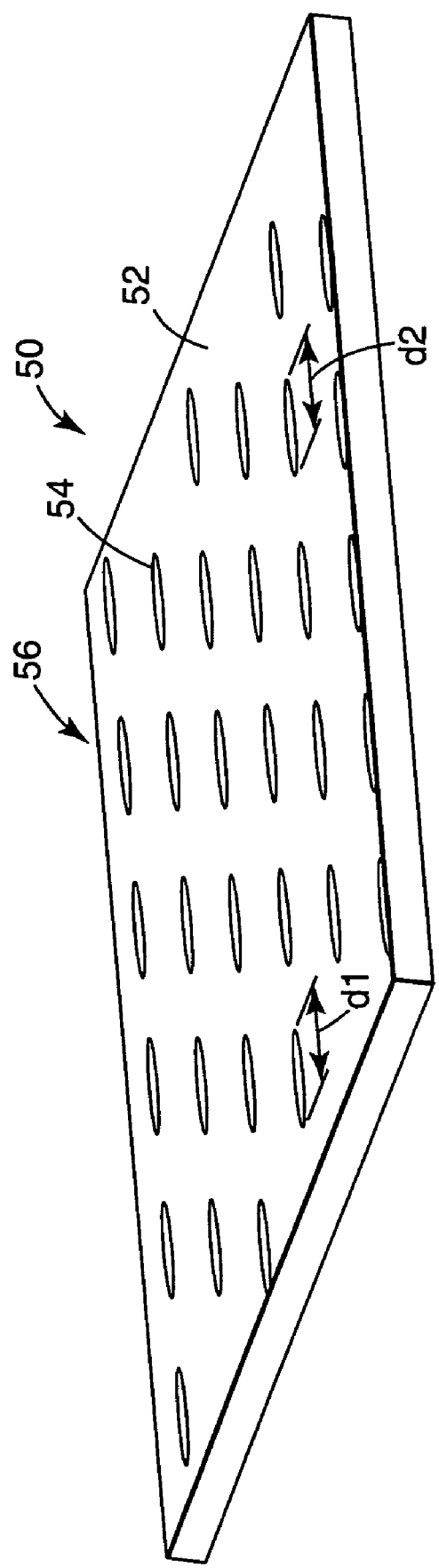
FIG. 3 is a perspective view of an optical film incorporating a programmed pattern of optical structures in accordance with another embodiment of the invention.

With reference to FIG. 3, an extractor film 50 is shown. Formed in a surface 52 of the extractor film are a plurality of optical structures 54 disposed in a pattern 56. The optical structures 54 are arranged essentially to replace the white dot pattern for providing extraction of light from the lightguide. While shown in FIG. 3 as circles or dots, the optical structures 54 are not collectively limited to any particular shape nor are they limited to any one particular shape within the pattern 56. Therefore, the optical structures 54 may be prisms, lines, dots, squares, ellipses or generally any shape. Moreover, the optical structures 54 may be spaced very closely together within the pattern 56, much more so than the dots within a dot pattern may be spaced and, for example, within about 50–100 µm of each other. This very close spacing of the optical structures 54 eliminates or reduces the need for diffusion in the output of the lightguide that is ordinarily necessary to hide the pattern of white dots. The invention also permits the changing of the slope of the lightguide at a micro-level. That is, the slope of the lightguide may be locally increased or decreased at the microlevel. When a light ray hits a higher positive slope, it will be extracted from the lightguide faster than if it hit the nominal wedge angle.

Figure 4:
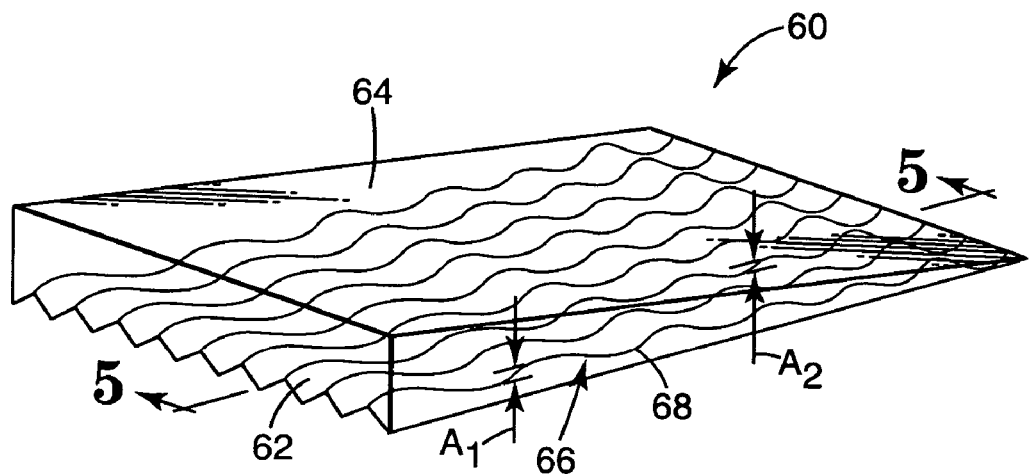
FIG. 4 is a perspective view of a lightguide wedge incorporating an in-phase programmed pattern of optical structures in accordance with another embodiment of the invention.
Figure 5:
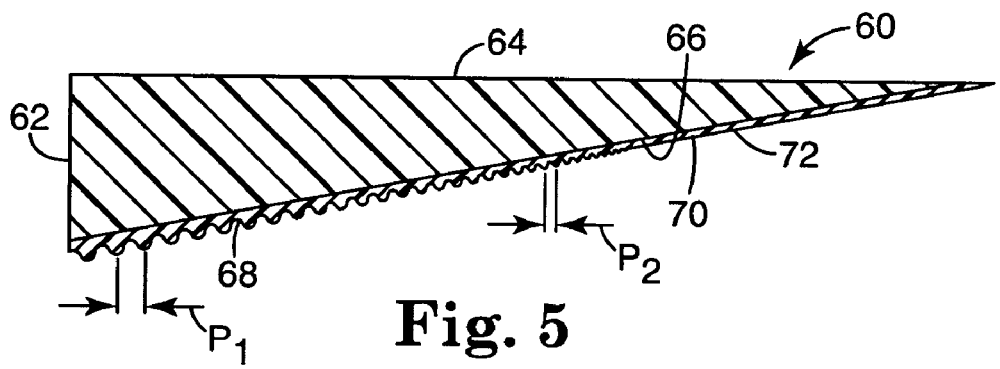
FIG. 5 is a cross-section view taken along line 5—5 of in FIG. 4.

While so far discussed in terms of optical films, the invention has application to the lightguide wedge itself. Referring to FIGS. 4 and 5, a lightguide 60 has in an input surface 62, and an output surface 64 and a back surface 66. The input surface 62 is arranged to be disposed adjacent a light source (not depicted) to provide a source of light incident to the input surface 62. The light incident to the input surface 62 is extracted out of the output surface 64 as a result of frustrated TIR within the lightguide 60. As discussed above, it is common for there to be non-uniformities in the light output from the lightguide 60, particularly near the input surface 62.

Figure 6:
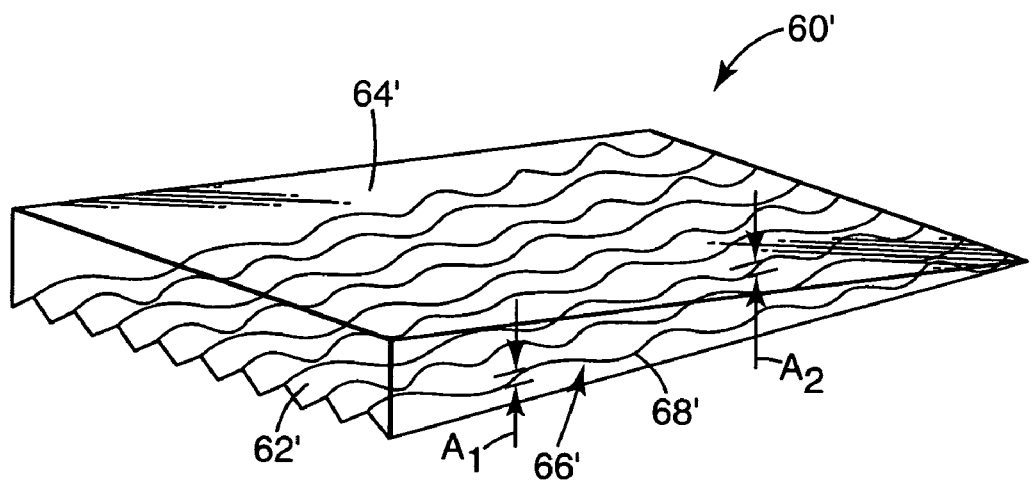
FIG. 6 is a perspective view of a lightguide wedge incorporating an out-of-phase programmed pattern of optical structures in accordance with another embodiment of the invention.

With continued reference to FIGS. 4 and 5, diffusion is added to the back surface 66 of the lightguide 60 and is further adjusted in intensity extending away from the input surface 62. That is, the back surface 66 is formed with in-phase optical structures 68 arranged to provide diffusive extraction near the input surface 62 and to taper to naught away from the input surface 62. The pattern can also be non-tapering, i.e., constant, over the entire surface, increasing from naught, randomly varying, or distributed in discrete regions. It is also possible for the optical structures to be out-of-phase, such as optical structures 68' formed in a back surface 66' of the lightguide 60' shown in FIG. 6. It will be appreciated that patterns of optical structures may also be formed in the output surface 64 either separately or in conjunction with a pattern formed in the back surface 66. The overall purpose of providing the optical structures is to achieve an effect that minimizes non-uniformities of the lightguide output wherever they may occur, and for the lightguide 60 shown in FIGS. 4 and 5, the non-uniformities appear primarily adjacent the input surface 62.

With reference to FIG. 5, the optical structures 68 may be formed on a surface 72 of an optical film 70. The optical film 70 may then be coupled to the wedge structure of the lightguide 60 using ultraviolet (UV) curing, pressure sensitive or any other suitable adhesive. Alternatively, the wedge may be molded in bulk to include the optical structures 68 in the back surface 66.

As will be more generally appreciated from the foregoing discussion, virtually any configuration of optical structures may be formed into an optical film, and the optical film coupled, for example by bonding, to a lightguide or other bulk optical element. For example, glare reduction, antiwetout, Fresnels, and virtually any other structure that may be formed in a surface of an optical film may be easily replicated into the film and then the film coupled to another optical element.

Films incorporating programmed optical structures may be manufactured using a microreplication process. In such a manufacturing process, a master is made, for example by cutting the pattern into a metal roll, and the master is used to produce films by extrusion, cast-and-cure, embossing and other suitable processes. Alternatively, the films may be compression or injection molded or roll formed. A preferred apparatus and method for microreplication is described in the commonly assigned U.S. patent application entitled "Optical Film With Defect-Reducing Surface and Method of Making Same," Ser. No. 09/246,970, the disclosure of which is hereby expressly incorporated herein by reference.

Figure 7:
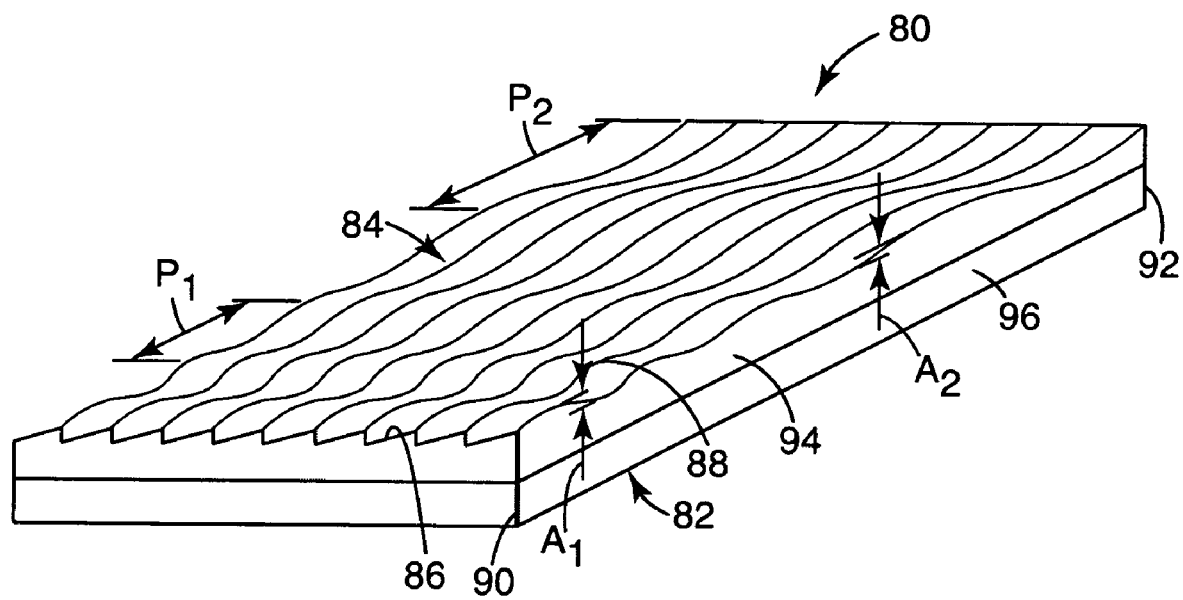
FIG. 7 is perspective view of a linear lens structure incorporating a programmed pattern of optical structures in accordance with another embodiment of the invention.

As an example of the above-described feature of the invention, and with reference to FIG. 7, a linear Fresnel lens or prism 80 has a substantially planar input surface 82 and an output surface 84. The output surface 84 is formed with lens structures 86 and superimposed on the lens structures 86 are additional optical structures 88. The optical structures 88 have characteristics, such as amplitude, period, and aspect ratio, that vary from a first edge 90 of the lens 80 to a second edge 92 of the lens 80. The lens 80 may be formed in bulk, or as shown in FIG. 7, the lens structures 86 including the optical structures 88 may be formed on a film 94 that is then bonded to a bulk optical substrate 96.

Figure 8:
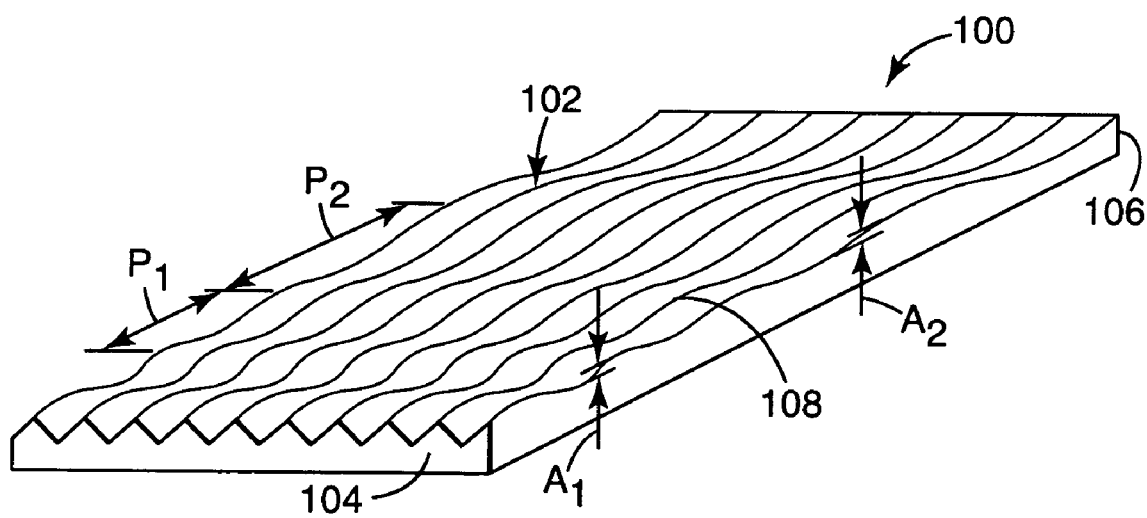
FIG. 8 is a perspective view of an optical film incorporating a programmed pattern of optical structures in accordances with an alternate preferred embodiment of the invention.

Referring now to FIG. 8, shown graphically is a film 100 containing a varying amplitude pattern 102 that was formed using a "V" shaped tool. The pattern 102 may be formed on a top and/or bottom surface of the film 100. Likewise, the pattern may be formed in a wedge or slab. The film 100 has a first edge 104 and a second edge 106. Extending from the first edge 104 toward the second edge 106 are a plurality of optical structures 108 arranged in the pattern 102. Each optical structure 108 may have a number of characteristics, such as amplitude, period and aspect ratio. The pattern 102 may also have characteristics, such as for example, a pitch, p, defining a spacing between optical structures 108. The optical structures 108 in FIG. 8 are shown having amplitude variation. In application of the film 100, the grooves may be arranged such that variation in amplitude is perpendicular to a lightsource of the lightguide incorporating the film 100.

With continued reference to FIG. 8, it is observed that within the pattern 102, the optical structures 108 are formed with larger amplitude at the first edge 104 and decrease in amplitude toward the second edge 106. The larger amplitude produces more optical power along the groove axis because of the higher surface slopes. The optical power of this pattern then decreases as a function of the distance from the first edge 104. This arrangement of the optical structures 108 and the pattern 102 is purposeful.

Figure 9:
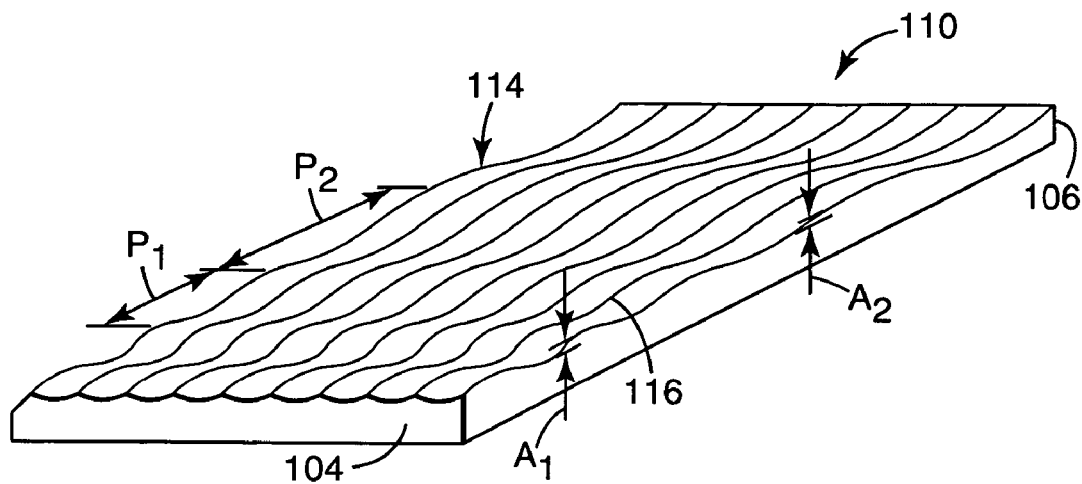
FIG. 9 is a perspective view of an optical film incorporating a programmed pattern of optical structures in accordances with an alternate preferred embodiment of the invention.
Figure 10:
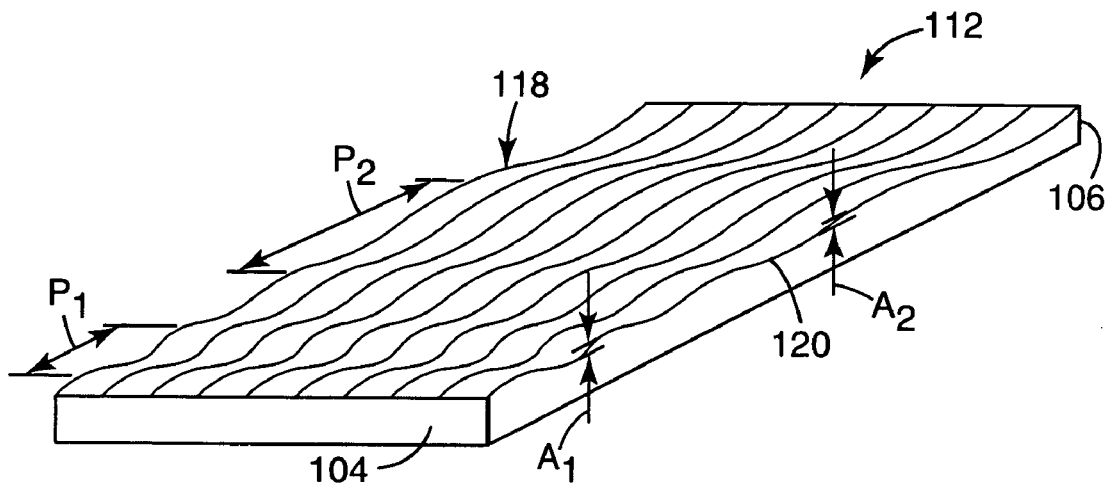
FIG. 10 is a perspective view of an optical film incorporating a programmed pattern of optical structures in accordances with an alternate preferred embodiment of the invention.

With reference to FIGS. 9 and 10, films 110 and 112, are shown respectively. Each film 110 and 112 has the same characteristics as film 100, and like reference numerals are used to describe like elements therebetween. As opposed to the pattern created by using a "V" shaped tool, the film 110, FIG. 9, has a pattern 114 of optical structure 116 that is formed using a curved nose tool. The film 112, FIG. 10, has a pattern 118 of optical structures 120 that is formed using a square nose tool. The patterns 114 and 118 are arranged as described to provide optical power in the surface or surfaces of the films 110 and 112. It will be appreciated that virtually any tool configuration may be used with the particular tool being selected to achieve a desired amount and form of optical power in the surface or surfaces of the film.

Figure 11:
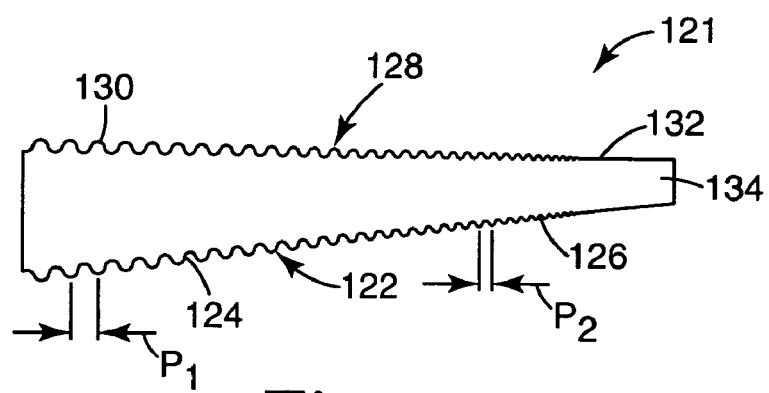
FIG. 11 is a side view of a lightguide incorporating first programmed pattern of optical structures in a top surface and a second programmed pattern of optical structures in a bottom surface in accordance with a preferred embodiment of the invention.

In the lightguide 121 illustrated in FIG. 11, a first pattern 122 of optical structures 124 is formed in a bottom surface 126 and a second pattern 128 of optical structures 130 is formed in a top surface 132 of the wedge 134. The first pattern 122 may be arranged to facilitate the extraction of light from the wedge 134, while the second pattern 128 may be arranged to mask non-uniformities in the light output from the wedge. It will be appreciated, however, that the patterns implemented in the wedge 134 will depend on the desired light output to be achieved from the wedge 134. Moreover, as described above, the patterns 122 and 128 may be formed first in an optical film that is later coupled to the wedge, for example, by bonding. In another form, surfaces 122 and 128 are injection molded with the wedge.

Still other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An optical trausmissive him comprising a first surface, a second surface opposing the first surface, a first edge extending between the first and the second surfaces, and a second edge opposing the first edge, wherein at least one of the first and second surface has a plurality of optical structures arranged in an optical pattern, each of the plurality of optical structures has optical characteristics varying alone a first direction running from the first edge toward the second edge, as a function of the location, and the optical pattern has optical characteristics varying along a second direction perpendicular to the first direction, wherein the first edge is located relatively nearer to a light source than the second edge, and the optical characteristics of the optical structures vary such that the optical magnitude of each optical characteristic gradationally decreases from the first edge toward the second edge along the first direction.

2. An optical transmissive film according to claim 1, wherein the varying optical characteristics of the optical structures are selected from the group consisting of an amplitude, a period, an aspect ratio and combination thereof.

3. An optical transmissive film according to claim 2, wherein the optical structure is a tapering wave whose amplitude and pitch are gradationally decreased from the first edge toward the second edge along the first direction.

4. An optical trausmissive film according to claim 1, wherein the optical structures contains discrete structures.

5. An optical trausmissive mm according to any of claims 1, wherein the pattern is a periodically repeating pattern.

6. An optical transmissive film according to claim 5, wherein the pattern is a V shaped, a curve-shaped, or a wedge-shaped pattern.

7. An optical transmissive film according to claim 1, the optical trausmissive film being a redirecting film, wherein the first surface serves as a light input surface and the second surface serves as a light output surface.

8. An optical transmissive film according to claim 1, wherein the optical structure is formed in an in-phase type or an out-of-phase type.

9. An optical transmissive film according to claim 1, wherein the pattern is formed in an in-phase type or an out-of-phase type.

10. An optical transmissive film according to claim 1, the optical transmissive film being a diffusive film coupled to a lightguide.

11. An optical element comprising:

a lightguide having a light output surface, a back surface opposing the light output surface, and a light input edge extending between the light output surface and the back surface; and an optical transmissive film, coupled to the lightguide, having a first surface, a second surface opposing the first surface, a first edge and a second edge opposing the first edge, at least one of the first and second surface of the optical transmissive film having a plurality of optical structures arranged in a pattern, wherein each of the plurality of optical structures has optical characteristics varying along a first direction running from the first edge to the second edge, as a function of the location, and the pattern has optical characteristics varying along a second direction perpendicular to the first direction, wherein the first edge is located relatively nearer to a light source than the second edge; and the optical characteristics of the optical structures vary such that the optical magnitude of each optical characteristic gradationally decreases from the first edge toward the second edge along the first direction.

12. An optical element according to claim 11, wherein the optical characteristics of the pattern are periodically repeated.

13. An optical element according to claim 11, wherein, at least one of the output surface and the back surface of the lightguide further comprises a plurality of optical structures arranged in a pattern thereon, each of the plurality of optical structures has optical characteristics varying from the light input surface toward its opposite edge alone a first direction running as a function of the location, and the pattern has optical characteristics varying along a second direction perpendicular to the first direction.

* * * * *

UNITED STATES PATENT AND TRADEMARK OFFICE
CERTIFICATE OF CORRECTION

PATENT NO. : 7,221,847 B2  
APPLICATION NO. : 10/910428  
DATED : May 22, 2007  
INVENTOR(S) : Mark E. Gardiner It is certified that error appears in the above-identified patent and that said Letters Patent is hereby corrected as shown below:

Page 2,  
Column 1, Line 63, delete "5,779,337" and insert -- 5,799,337 -- therefor.

Page 2,  
Column 2, Other Publications, delete "Polazrized" and insert -- Polarized -- therefor.

Column 7,  
Line 56, delete "trausmissive him" and insert -- transmissive film -- therefor.

Column 7  
Line 65, delete "alone" and insert -- along --, therefor.

Column 8  
Line 20, delete "trausmissive" and insert -- transmissive --, therefor.

Column 8  
Line 22, delete "trausmissive mm" and insert -- transmissive film --, therefor.

Column 8  
Line 22-23, delete "any of claims 1," and insert -- claim 1 --, therefor.

Column 8  
Line 28, delete "trausmissive" and insert -- transmissive --, therefor.

Column 10  
Line 3, delete "alone" and insert -- along --, therefor.

Signed and Sealed this

Third Day of July, 2007

JON W. DUDAS  
*Director of the United States Patent and Trademark Office*